July 5, 1955 C. J. RAYNOR 2,712,233
BALE WEIGHT INDICATOR
Filed March 19, 1953 3 Sheets-Sheet 1
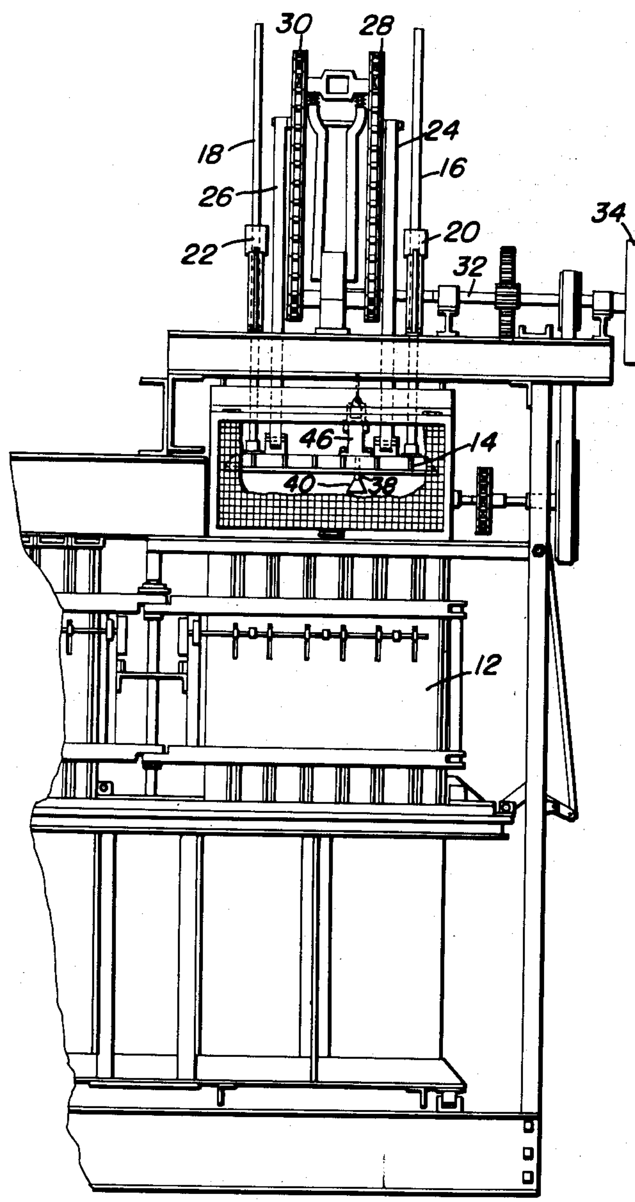
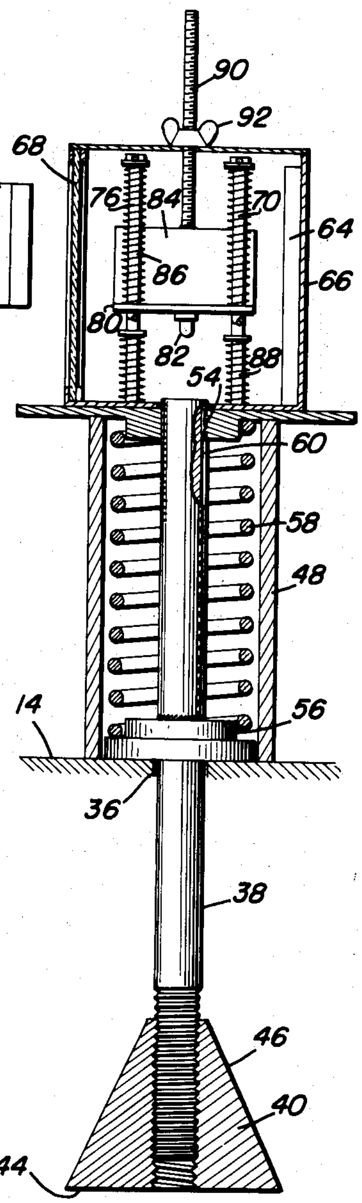
Charlie J. Raynor
INVENTOR.
BY Clarence A. O'Brien
and Harvey B. Jacobson
Attorneys July 5, 1955 C. J. RAYNOR 2,712,233
BALE WEIGHT INDICATOR
Filed March 19, 1953 3 Sheets-Sheet 2
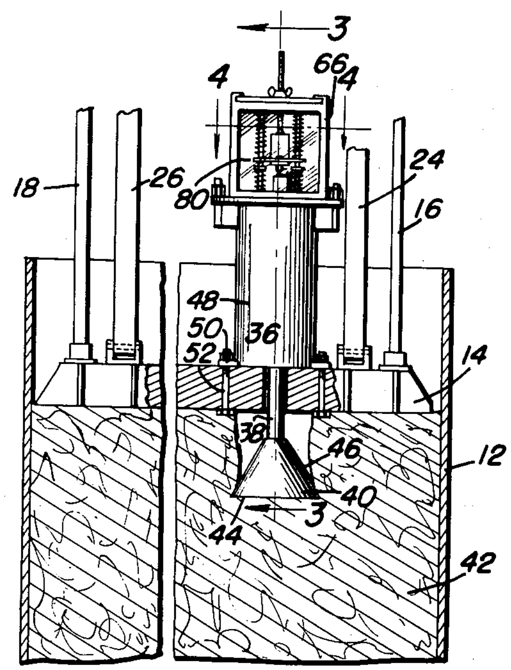
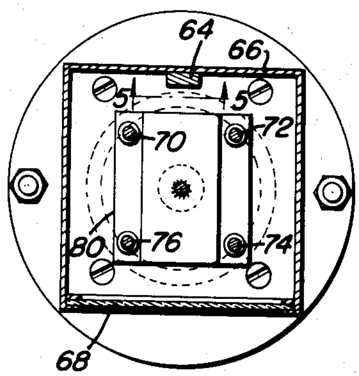
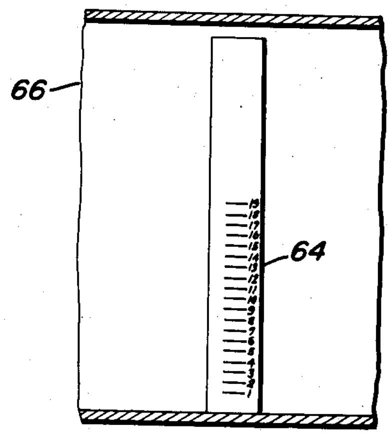
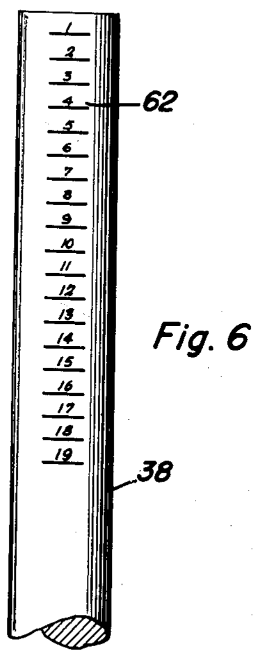
Charlie J. Raynor
INVENTOR.
BY Clarence A. O'Brien and Harvey B. Jacobson
Attorneys July 5, 1955 C. J. RAYNOR 2,712,233
BALE WEIGHT INDICATOR
Filed March 19, 1953 3 Sheets-Sheet 3
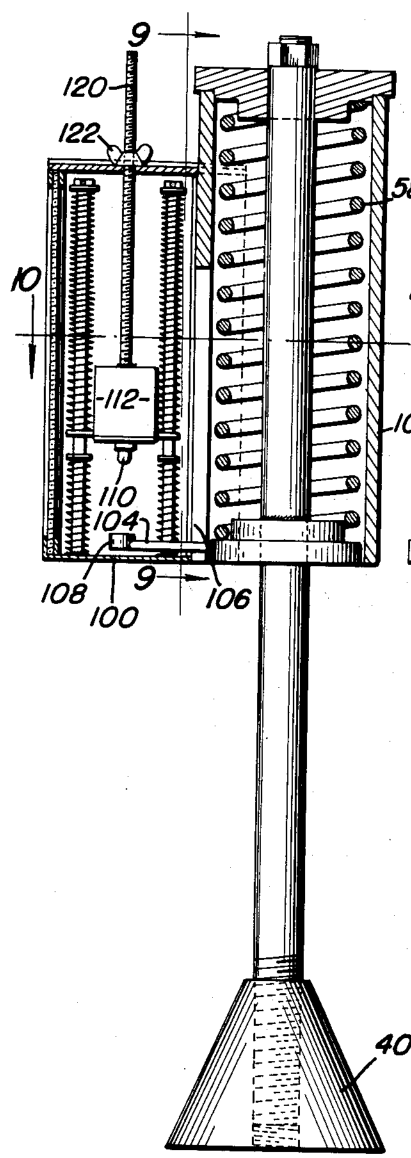
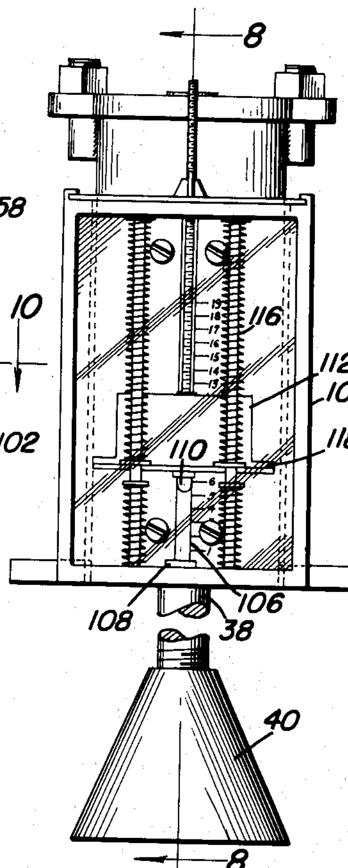
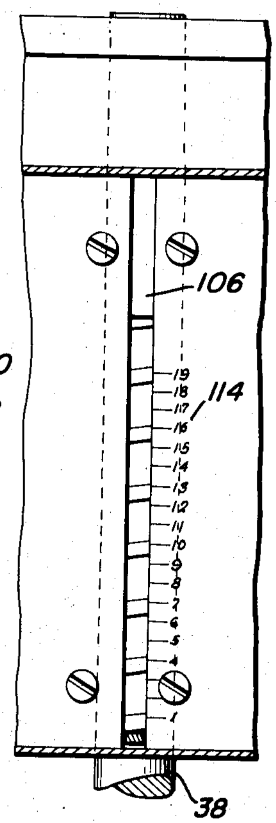
100
58
104
102
38
Fig. 10
112
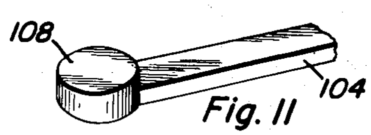
Charlie J. Raynor
INVENTOR.
BY Clarence A. O'Brien and Harvey B. Jacobson
Attorneys United States Patent Office 2,712,233

Patented July 5, 1955

2,712,233

BALE WEIGHT INDICATOR

Charlie J. Raynor, Rocky Mount, N. C.

Application March 19, 1953, Serial No. 343,390

7 Claims. (Cl. 73—141)

This invention relates to a weight indicator and particularly to a projectile plunger to be mounted in a tramper of a baler or compressor to indicate the weight of the bale being formed therein.

In the operation of baling cotton and other compressible materials, it is customary to provide a box-like chamber into which the material is compressed and have a tramper for reciprocating in and out of the box for compressing loose material into the container. In baling cotton, it is desirable to have a substantially identical weight in each of the bales, and for this purpose, a system of penalties is provided for underweight and overweight bales. For example, if a cotton bale weighs under 600 pounds, there is a forfeiture or penalty therefor, and if a bale weighs over 675 pounds, there is another penalty, usually of less severity, for such overweight.

The present invention provides a means responsive to the substantial weight of the cotton, or other material, in the compressor chamber so that the weight of the bale may be readily determined. This is accomplished by means of a projectile plunger mounted in the tramper plate and extending into the container by means of a flexible spring so that the compression of the material in the chamber will compress the spring and cause the plunger to move backwardly toward the plate. A scale may be mounted either on the portion of the plunger or on the portion adjacent to the plunger so that the operator may see how much the plunger compresses the spring so that the weight reads directly on the scale. It will thus be possible for the operator to look at the amount of compression of the spring or judge the same by means of the scale and tell the approximate weight of the bale being formed. Instead of an indicator associated directly with the plunger, the weight may be indicated by either a fluid pressure system utilizing either a non-compressible, such as water or oil, or compressible fluids, such as air, to actuate a gauge calibrated in any desirable units. Also, an electrical transmission circuit may be utilized to record or indicate the weight at any desired position or positions.

In some instances, it may be desirable to provide an electric switch to be operated by a predetermined compression of the plunger spring, or other actuator, so that when a predetermined weight of cotton, or other material, has been received in the press, the plunger will actuate the switch which will give a signal, control the compressor motor, shut off the supply of cotton, or otherwise determine the size of the bale.

The projectile plunger, or contact member, may be mounted on any conventional part of the compressor or other container whereby the material being compressed is forced against the plunger in proportion to the weight in the compressor.

It is accordingly an object of the invention to provide an improved weight indicator.

It is a further object of the invention to provide a weight indicator for use with a compressor baler.

It is a further object of the invention to provide an indicator which will actuate a switch upon the determination of a predetermined size of bale.

It is a further object of the invention to provide a weight indicator having a switch adjustably mounted for control by the plunger.

Other objects and many of the attendant advantages of the present invention will be apparent from the following detailed description, taken in conjunction with the accompanying drawing in which:

Figure 1 is a front elevation of a part of a cotton tramper with parts broken away to show the weight indicator in position;

Figure 2 is an enlarged sectional elevation of the tramper head showing the installation of the weight indicator;

Figure 3 is a sectional elevation of the weight indicator taken substantially on the plane indicated by line 3—3 of Figure 2;

Figure 4 is a cross-section through the indicator taken substantially on the plane indicated by the line 4—4 of Figure 2;

Figure 5 is a view taken substantially on the plane indicated by the line 5—5 of Figure 4;

Figure 6 is an enlarged view of the top of the plunger;

Figure 7 is a side elevation of a slightly modified indicator;

Figure 8 is a sectional elevation taken substantially on the plane indicated by the line 8—8 of Figure 7;

Figure 9 is a view taken substantially on the plane indicated by the line 9—9 of Figure 8;

Figure 10 is a cross-section taken substantially on the plane indicated by the line 10—10 of Figure 8; and Figure 11 is a perspective view of the actuating arm of the modification indicated in Figure 8.

In the exemplary embodiment according to the invention, a cotton compressor of the box type is provided with a compression box 12 into which a tramper head 14 reciprocates. The tramper head 14 is provided with a plurality of guides 16 and 18 mounted in suitable guide bushings 20 and 22. Suitable mechanism is provided for reciprocating the tramper head 14 herein indicated as pitmans 24 and 26 driven by suitable operating chains 28 and 30 actuated by a suitable drive shaft 32 which may be driven by any suitable manner, herein indicated as a belt pulley 34.

The above described cotton tramper is a well known standard piece of equipment and no portion of the present invention.

The weight indicator itself is comprised of an aperture 36 in the tramper head 14 through which extends a plunger 38 which is provided with an enlarged head 40 for engagement with the cotton 42 or other compressible material in the container 12. The front of the head 14 is provided with an enlarged face 44 and with a tapered back portion 46 so that the head 40 may be readily withdrawn from the material being packed.

A substantially cylindrical housing 48 is mounted on the tramper 14 by means of ears 50 and suitable fasteners such as the bolts 52. The shaft 38 or plunger extends upwardly through the housing 48 and is provided with a bearing 54 at the top of the housing 48 so that the plunger reciprocates through the housing 48. A shoulder 56 is welded or otherwise secured on the plunger 38 and a spring 58 is mounted between the bearing 54 and the collar 56 so that the spring 58 urges the plunger 38 outwardly of the tramper head 14 so that the plunger 38 is extended outwardly from the tramper head 14 into the material being compressed. Preferably a keyway 60 is provided in the top of the plunger 38 so that the plunger is non-rotatably mounted with respect to the guide way 54.

A scale 62 may be mounted on the top of the plunger 38 so that the operator of the device may glance at the scale and see the amount of compression of the spring 58 which will be calibrated in any desired units to indicate the weight of material in front of the head 40. Instead of mounting the scale 62 on the top of the plunger 38, the scale 64 may be mounted in proximity to the top of the plunger 38 so that the plunger 38 will obscure a portion of the scale 64 so that the height to which the plunger is driven may be readily determined.

In order to properly house and operate the device, a housing 66 is mounted on top of the housing 48 and at least one side of the housing 66 is provided with a transparent panel 68. A plurality of longitudinally extending guide members or guide bars 70, 72, 74 and 76 are mounted in the housing 66 and extend the full length thereof. A switch plate 80 is mounted on the guides 70 to 76 and a switch actuating plunger 82 extends from the bottom side thereof, the switch being housed in a suitable container 84. Springs 86 are mounted on each of the guide members 70 to 76 and urge the plate 80 downwardly on the guide members 70 to 76. Bumper springs 88 are mounted on the guide members 70 to 76 below the plate 80 so that the plate 80 is resiliently mounted for traversing along the guides 70 to 76. In the modifications indicated in Figures 1 to 4, the switch actuating plunger 82 is mounted directly in the path of travel of the plunger 38 so that the top of the plunger acts as a member to engage the switch lever 82 to actuate the switch on a predetermined motion of the plunger 38. An adjusting rod 90 is rigidly secured to the housing 84 so that the plunger 82 may be adjusted with respect to the top of the plunger 38 by means of a wing nut 92. The adjusting rod 90 and the wing nut 92 thereby limit the advance of the plate 80 toward the plunger 38 but allow the plate 80 to move backwardly under the impact of the plunger 38 so that the switch will not be broken. In certain machines, it is impractical to provide the housing 66 above the plunger 38 and in this event, a housing 100 may be provided on the tramper head laterally of the housing 102 and an arm 104 may be extended through a slot 106 and be provided with a head 108 for impact with a switch operating lever 110 of a switch mounted in a housing 112 on a plate 114. A scale 116 may be provided in the housing 100 adjacent to the slot 106 and may be either directly by the arm 104 or may be utilized to adjust the housing 112 so that the plunger 110 will be at the proper weight level for the head 108. Springs 116 drive the plate 118 downwardly into contact with the head 108 while the screw threaded rod 120 and the wing nut 122 serve as limiting members for the switch box 112.

In the operation of the weight indicator according to the invention, the plunger member is mounted on the tramper head and when the tramper head projects into the compression box, the loose material will exert a pressure on the plunger to compress the spring 58 so that the plunger will move upwardly through the tramper head 14. Depending upon the size of the head 40, the plunger will be more or less depressed so that a scale either on the plunger or mounted back of the same may be utilized to determine the amount of compression of the spring 58 and consequently, the weight of the bale in the box 12. If desired, the switch may be utilized to shut down the press or to perform any other desired operation when the desired weight of bale has been acquired.

Also as indicated, the indicator box may be mounted directly above the piston 38 or if there is not sufficient room therefor or it is more convenient otherwise, the indicator head may be mounted laterally of the plunger chamber so that an arm mounted on the plunger may be utilized to actuate the device.

When the switch is to be used with respect to either the plunger 38 or the arm 104, the wing nut 92 or 122 will be utilized to lift the plate 80 or 118 upwardly in the indicator box so that the bottom of the plunger 82 or 110 will be at the proper point on the scale 64 or 114 so that the plunger or the arm either will strike the actuating arm and operate the switch at the predetermined size of the bale.

It will be apparent that the present invention provides an indicator which can be used to determine approximate weight of a bale being compressed so that the mill operator will be free from the fines either for under- or overweight with respect to the bales produced therein.

While for purposes of exemplification, a presently preferred embodiment of the invention has been shown and described according to the best present understanding thereof, it will be apparent that changes and modifications may be made in the construction and arrangement of the parts thereof without departure from the true spirit and purpose of the invention.

What is claimed as new is as follows:

1. A cotton compressor comprising a container, a tramper movable into and out of said container, said tramper having an aperture therein, a plunger slidably mounted in said aperture and extending into contact with the cotton below said tramper, a spring mounted on said tramper and engaging said plunger, said spring yieldingly urging said plunger into projected relation with said tramper, a switch mounted in the path of travel of said plunger, resilient means urging said switch toward said plunger, adjustable means limiting the approach of said switch toward said plunger.

2. A cotton compressor comprising a container, a tramper movable into and out of said container, said tramper having an aperture therein, a plunger slidably mounted in said aperture, said plunger extending into contact with the cotton in said chamber, a spring mounted on said tramper and engaging said plunger, said spring yieldingly urging said plunger into projected relation with said tramper, a switch mounted in the path of travel of said plunger, resilient means urging said switch toward said plunger, adjustable means limiting the approach of said switch toward said plunger, said plunger having an enlarged head, the rear of said head being tapered.

3. A cotton compressor comprising a container, a tramper movable into and out of said container, said tramper having an aperture therein, a plunger slidably mounted in said aperture, said plunger extending below said tramper into contact with the cotton in said container, a spring mounted on said tramper and engaging said plunger, said spring yieldingly urging said plunger into projected relation with said tramper, a plurality of guide members, a switch plate slidable on said guide members, a switch mounted on said plate, springs urging said plate in one direction on said guide members, adjustable means limiting the movement in one direction, means carried by the plunger projectile into contact with said switch.

4. In a cotton baler having a receiving chamber and a reciprocating tramper operative to compress loose cotton into said chamber, a bale weight indicator comprising a plunger slidably mounted in said tramper, there being an aperture in said tramper receiving said plunger, a presser foot on said plunger, resilient means urging said presser foot into contact with the cotton in said chamber, and means indicating the pressure applied to said presser foot, a switch housing resiliently mounted in the path of travel of said plunger.

5. In a cotton baler having a receiving chamber and a reciprocating tramper operative to compress loose cotton into said chamber, a bale weight indicator comprising a housing mounted on said tramper, said tramper having an aperture communicating said housing with said chamber, a plunger slidably mounted in said housing and extending through said aperture, a presser foot on the extending end of said plunger, a spring mounted in said housing, said spring urging said plunger in extended relation through said aperture, a bearing aperture in said housing opposed to the aperture in said tramper, said plunger extending through said bearing aperture, a scale associated with the end of the plunger extending through the bearing aperture.

6. For use with a cotton compressor having a receiving chamber and a reciprocating tramper head operative to compress loose cotton into a bale, a bale weight indicator comprising a plunger slidably mounted with respect to said tramper head, resilient biasing means yieldingly urging said plunger into contact with the cotton compressed by said tramper and means indicating the resistance encountered by said plunger, a resiliently mounted switch disposed in the path of travel of said plunger.

7. In a cotton baler having a receiving chamber and a reciprocating tramper operative to compress loose cotton into said chamber, a bale weight indicator comprising a housing mounted on said tramper, said tramper having an aperture communicating said housing with said chamber, a plunger slidably mounted in said housing and extending through said aperture, a presser foot on the extending end of said plunger, a spring mounted in said housing, said spring urging said plunger in extended relation through said aperture, a bearing aperture in said housing opposed to the aperture in said tramper, said plunger extending through said bearing aperture, a scale associated with the end of the plunger extending through the bearing aperture, a switch housing resiliently mounted in the path of travel of said plunger, a switch mounted in said housing for actuation by said plunger.

References Cited in the file of this patent

UNITED STATES PATENTS

| | | |
|---|---|---|
| 636,160 | Mitchell | Oct. 31, 1899 |
| 662,299 | Patterson | Nov. 20, 1900 |
| 2,561,266 | Dietert | July 17, 1951 |
| 2,579,444 | Taylor | Dec. 18, 1951 |